Nov. 5, 1957  H. N. IRVINE  2,811,821
COMBINE HEADER AND REEL ADJUSTING MECHANISM
Filed July 10, 1953  2 Sheets-Sheet 1

INVENTOR.
HOUSTON N. IRVINE
BY

INVENTOR.
HOUSTON N. IRVINE

United States Patent Office 2,811,821
Patented Nov. 5, 1957

2,811,821

COMBINE HEADER AND REEL ADJUSTING MECHANISM

Houston N. Irvine, Burlington, Iowa, assignor to J. I. Case Company, Racine, Wis., a corporation of Wisconsin Application July 10, 1953, Serial No. 367,174

1 Claim. (Cl. 56—208)

This invention relates to a combination harvester-thresher for grain and the like, and specifically to the mechanism employed for adjusting the reel relative to the header. The implement to which this invention relates usually carries a cutter bar at the forward edge of the header.

It has been found that it is often desirable to maintain a fixed relationship between the reel, and the header or cutter bar of the harvester-thresher when the header is being adjusted for height, so that a corrective adjustment is not required when the header is adjusted.

It is also desirable to provide a reel adjustment which can be made conveniently from the tractor seat whenever crop conditions require a change in relationship between the reel and the header.

Various arrangements are now available which permit the tractor operator to adjust the header and reel by reaching from the tractor seat, but many of these arrangements require corrective adjustments to be made in the reel position each time the header is raised or lowered relative to the ground. In the present instance when the reel has once been adjusted to its proper relationship to the header and cutter bar, an adjustment of the header will not affect this relationship.

An object of this invention is to provide a means of adjusting a reel relative to the header of a harvester-thresher which means requires only a minimum of effort to actuate the mechanism.

Another object is to provide a device that permits adjustments in small increments to be made between the reel and the header.

Another object is to provide a reel adjustment that permits the reel to remain in constant relationship with the header during adjustment of the latter relative to the ground.

Another object is to provide a reel adjustment that is not disturbed by vibration caused by passing over rough ground.

Further objects and advantages of the invention will become apparent from a consideration of the following detailed description taken in connection with the accompanying drawings wherein a satisfactory embodiment of the invention is shown. However it is to be understood that the invention is not limited to the details disclosed but includes all such variations and modifications as fall within the spirit of the invention.

Figure 1:
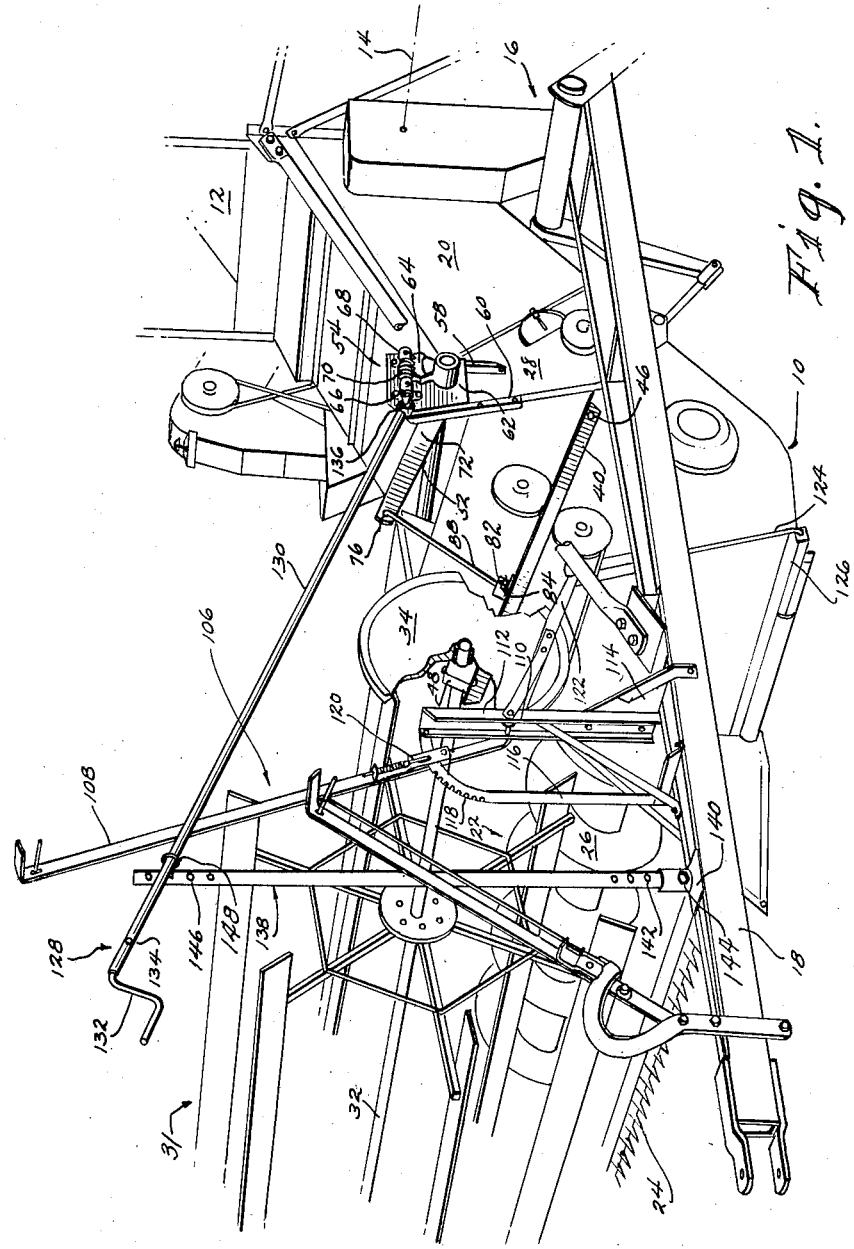

Referring to the drawings Fig. 1 is a perspective left side view of a combine embracing the present invention.

Figure 2:
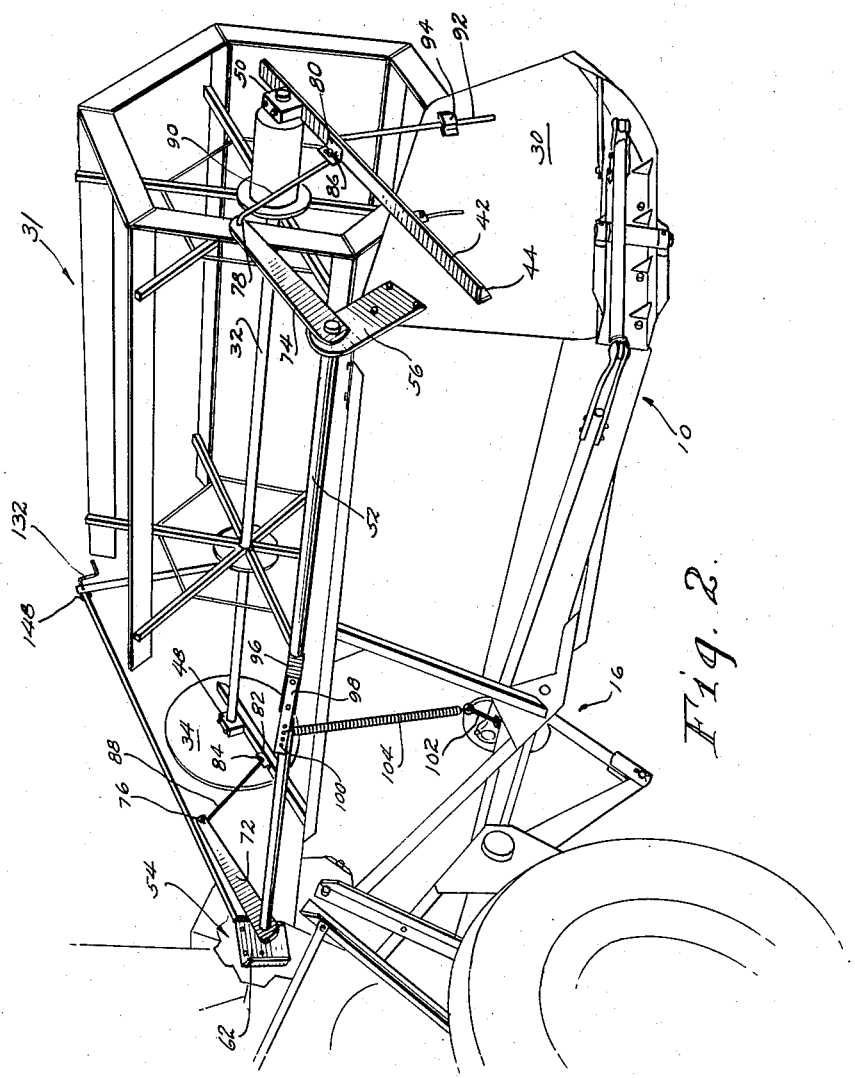

Fig. 2 is a perspective view of the combine looking forwardly at the right-hand end of the header.

Referring to the drawings, header 10 is positioned forwardly of the thresher portion 12 and is pivoted on the latter on a transverse axis 14.

A frame 16 is provided to support the various elements and has extending forwardly therefrom a fixed drawbar 18. Drawbar 18 provides the means for transporting the implement as well as to support the header and reel adjusting mechanism. Header 10 comprises a housing 20 which extends forwardly and terminates in the header trough 22. This trough extends laterally from the housing 20 and transversely to the direction of travel of the implement.

A cutter bar 24 is positioned at the lower front edge of trough 22 and provides the means of severing the crop from the ground which crop is then deposited in the header trough 22. An auger 26 carries the crop laterally into the housing 20 which crop is then carried rearwardly into the thresher housing 12 where it is operated upon by the conventional threshing mechanism.

Header 10 is provided with end walls 28 and 30 which are substantially vertical and carry various members of the implement.

A reel 31 is positioned transversely of the direction of travel and above the cutter bar 24. The purpose of the reel is to urge the grain rearwardly against the cutter bar 24 and prevent the grain from falling forwardly away from the auger 26. The vertical position of the reel 31 relative to the cutter bar 24 is important in that various grain conditions require the reel to be adjusted for height over the cutter bar and it is the purpose of this invention to provide such an adjustment. Reel 31 is provided with a shaft 32 which extends from end to end of the header 10 and supports the reel 31 by the usual hub and spider construction. Shaft 32 extends outwardly sufficiently at one end to receive a drive pulley 34 which is used to rotate the reel from the conventional drive mechanism of the harvester through a belt (not shown). A conventional belt tightening means (not shown) is provided to maintain the correct tension on belt 36.

The invention will now be described by referring to the drawings:

Referring to Figs. 1 and 2, reel 31 is carried by a pair of arms 40 and 42 which are pivoted on pivot bolts 44 and 46. Pivot bolts 44 and 46 are secured to walls 28 and 30 and arms 40 and 42 pivot freely about these bolts. Arms 40 and 42 swing vertically at their forward ends and carry bearing blocks 48 and 50 which are secured thereto by conventional bolts. Blocks 48 and 50 are the conventional maple bearing blocks used for this purpose and need not be further described.

A rock shaft 52 is supported on header 10 rearwardly of shaft 32. Rock shaft 52 is parallel to shaft 32 and is pivotally supported in end brackets 54 and 56. Bracket 54 is secured to wall 28 by a pair of angle arms 58 and 60. These angle irons support base plate 62 on which the adjusting mechanism is secured. Rock shaft 52 extends through and is journaled in plate 62 and terminates in a worm gear sector 64. Sector 64 is pinned or otherwise secured to rock shaft 52. Bracket 56 is secured to wall 30 in any convenient manner.

A pair of bearings 66 and 68 are secured to plate 62. These bearings support worm 70 which in turn engages sector 64. Rock shaft 52 has secured at each end thereof forwardly and upwardly extending levers or arms 72 and 74, these levers having apertures 76 and 78 at their forward ends. Arms 40 and 42 have attached thereto angle brackets 80 and 82 having upwardly extending flanges and have provided therein a pair of apertures 84 and 86. A pair of connecting links 88 and 90 comprise the connecting links between levers 72 and 74, and arms 40 and 42. Links 88 and 90 have end portions bent at right angles to the body of the link and which portions are inserted in the apertures 76 and 78 of levers 72 and 74 and in apertures 86 and 84 of brackets 80 and 82. Links 88 and 90 are freely engageable in their respective apertures so as to permit freedom when adjusting the reel, and are held in place by conventional cotter pins.

A guide member 92 is pivoted to arm 42 and extends downwardly in contact with wall 30. A guide bracket 94 is secured to wall 30 and confines guide member 92 to vertical movement in contact with wall 30 so as to resist lateral shifting of arm 42.

A rearwardly extending arm 96 is secured to rock shaft 52 and carries an extension 98 which is bolted or otherwise fastened thereto. Arm 98 has a series of holes 100 at the rearward end thereof to provide an adjustment in tension of spring 104. An eyelet 102 is secured to frame 16 rearwardly of header 10. A coil spring 104 extends from one of the apertures 100 to the eyelet 102, the latter being provided with adjustment for obtaining the proper tension on spring 104.

A header lifting means 106 is located forwardly on drawbar 18 and provides the means for the operator to raise the header from his position on the tractor seat. Header lifting means 106 comprises a lever 108 which is pivoted about a pin 110 supported by a vertical bracket 112. Bracket 112 is supported by a plate 114 on drawbar 18. A rack 116 is secured to member 112 and drawbar 18, and is provided with notches 118. Lever 108 has a detent 120 which engages notches 118 so as to lock the header after an adjustment has been made by the tractor operator.

Lever 108 is provided with an integral arm 122 which extends downwardly and rearwardly and terminates in a pivoted downwardly-extending link 124. The header 10 is provided with a transverse angle iron 126, the end of which has an aperture which provides a pivot for link 124.

In order to provide a convenient means of adjusting reel 31 relative to header 10, a forwardly extending adjusting member 128 is provided. This member comprises a tubular portion 130 which has at the front end thereof a crank 132 which is inserted in member 130 and a pin or bolt 134 is passed through members 130 and 132 so as to secure the latter with the adjusting member. Member 130 extends to a point adjacent the end of the worm 70, the latter having an extending portion which protrudes from bearing 66. A universal joint 136 is secured to the extending portion of worm 70 and to the adjusting member 130. The purpose of the universal joint 136 is to allow the header to be raised or lowered without substantially moving the crank 132 out of reach of the operator. A supporting post 138 is provided at the forward end of the drawbar 18 which serves to support the adjusting member 128 at a convenient position. Post 138 is secured in a bracket 140 on the drawbar 18. Post 138 is provided with a series of holes 142 which can be aligned with a bolt 144 so that the height of the post can be varied. Post 138 has provided at the upper end thereof another series of holes 146. An eyelet 148 freely surrounds tubular portion 130 and has a shank which passes through the desired hole 146 so as to obtain an additional means of adjusting the height of the adjusting member 128.

In summarizing, when a tractor operator desires to raise the cutter bar and the header relative to the ground he moves lever 108 to the desired position. With the present invention, reel 31 moves up or down a corresponding amount retaining its relationship with the header. However, if the operator desired to increase or decrease the distance between the reel and the cutter bar he rotates crank 132 either left or right according to whether he desires to increase or decrease the distance between the cutter bar and the reel.

It is believed that the present invention provides a convenient and efficient means of adjusting a reel relative to a header without making it necessary for the operator to dismount from his seat.

The above being a complete description of an illustrative embodiment of the invention, what is claimed as new and desired to be secured by Letters Patent of the United States is:

In a harvester thresher of the type having a frame, a drawbar extending forwardly from the frame for connection with a tractor, a header having a pivotal connection on said frame for up-and-down swinging movement relatively thereto, means for so swinging said header and a reel mounted on the header for up-and-down movement with the header and also for up-and-down adjustment on said header; the combination of a pair of arms having free ends supporting the reel and each having its other end pivoted to the header independently of the frame, a rockshaft rotatably mounted on said header independently of the frame, a pair of arms each having one end rigidly connected to the rockshaft and having means at its opposite end connecting it with one of said pivoted arms intermediate the ends thereof for raising and lowering said reel in response to rocking of said rockshaft, a worm gear fixed on said rockshaft, a worm journaled on said header in mesh with said worm gear, an actuating shaft extending generally forwardly along said drawbar, a universal connection between said worm and said actuating shaft, said shaft extending to a region within the reach of an operator on the tractor, manually operable means on said actuating shaft for rotating the same at will, and a supporting element on said drawbar, on which said actuating shaft is journaled for supporting said shaft, and consequently said manually operable means in a position within reach of an operator regardless of the swinging of said header about said pivotal connection.

References Cited in the file of this patent

UNITED STATES PATENTS

| | | |
|---|---|---|
| 414,160 | Nichols | Oct. 29, 1889 |
| 1,794,720 | Maysent | Mar. 3, 1931 |
| 2,095,364 | Konow | Oct. 12, 1937 |
| 2,143,264 | Fleming | Jan. 10, 1939 |
| 2,199,629 | Heth et al. | May 7, 1940 |
| 2,226,563 | Keith | Dec. 31, 1940 |
| 2,410,918 | Acton | Nov. 12, 1946 |
| 2,510,425 | Sieverding | June 6, 1950 |
| 2,662,362 | Beasley | Dec. 15, 1953 |